United States Patent [19]

Wang

[11] Patent Number: 4,906,725
[45] Date of Patent: Mar. 6, 1990

[54] POLYCARBONATE CONTAINING SPIRO DILACTAM SEGMENT

[75] Inventor: Pen C. Wang, Houston, Tex.

[73] Assignee: Shell Oil Company, Houston, Tex.

[21] Appl. No.: 279,671

[22] Filed: Dec. 5, 1988

[51] Int. Cl.$^4$ ............................................. C08G 63/62
[52] U.S. Cl. .................................... 528/201; 528/196; 528/203; 528/204; 528/323
[58] Field of Search ................. 528/201, 203, 204, 196

[56] References Cited

U.S. PATENT DOCUMENTS 4,739,058 4/1988 Eckhardt et al. .................... 528/201

OTHER PUBLICATIONS

Schnell, Industrial and Engineering Chemistry, vol. 51, No. 2, pp. 157–160 (1959).

Primary Examiner—Harold D. Anderson

[57] ABSTRACT

Novel polycarbonate polymers of relatively high glass transition temperatures comprise carbonyl moieties alternating with moieties of a 1,6-diaza [4.4] spirodilactam having an oxaryl-containing substituents on each ring nitrogen atom and, optionally, moieties of di(oxyphenyl)alkane.

28 Claims, No Drawings

POLYCARBONATE CONTAINING SPIRO DILACTAM SEGMENT

FIELD OF THE INVENTION

This invention relates to certain novel polycarbonate polymers. More particularly, the invention relates to novel polymers which incorporate carbonyl moieties alternating with moieties of a 1,6-diazaspiro[4.4]nonane2,7-dione having oxyaryl-containing substituents on the spiro ring nitrogen atoms, and optionally, di(oxyphenyl)alkane moieties.

BACKGROUND OF THE INVENTION

The class of polycarbonate polymers is broadly known in the art. An early review article by Schnell, Industrial and Engineering Chemistry, Vol. 51, No. 2, pp. 157–160 (1959) describes properties of the class of polycarbonates and methods known in the art at that time for the preparation of polycarbonate polymers including certain polycarbonate polymers which are now commercial. In general, the polycarbonate polymers are thermoplastics whose glass transition temperatures will depend upon the nature and symmetry of the groups incorporated into the polycarbonate chain other than the carbonyldioxy groups. Most polycarbonates are derived from a bisphenol and commercial polycarbonates are frequently derived from 2,2-di(4-hydroxyphenyl)propane, also known as bisphenol A or BPA. The polycarbonate polymers are conventionally produced by reaction of a bisphenol or an alkali metal salt thereof with phosgene or by ester exchange with a diaryl carbonate, particularly diphenyl carbonate.

These polymers ar processed by conventional methods employed for thermoplastics such as injection molding or extrusion into films, sheets, fibers, tubing and shaped articles. The articles produced from the polycarbonate polymers demonstrate good resistance to oxygen, heat and light as well as to common solvents. While some of the polycarbonate polymers have moderately high glass transition temperatures and thus could be marginally useful as engineering thermoplastics in applications where exposure to elevated temperatures is likely to be encountered, many of the polycarbonate polymers have sufficiently low glass transition temperatures so that the usefulness of such polymers is thereby limited. The commercial polycarbonate based on BPA has a glass transition temperature on the order of 150° C., for example. It would be of advantage to provide a novel class of polycarbonate polymers of relatively high glass transition temperature and accordingly wider application.

SUMMARY OF THE INVENTION

This invention provides a class of novel polycarbonate polymers. More particularly, the invention provides novel polycarbonate polymers characterized by carbonyl moieties alternating with moieties of a 1,6-diaza[4.4]spirodilactam having a oxyaryl-containing substituent on each spiro ring nitrogen atom, and optionally, moieties of a di(oxyphenyl)alkane.

DESCRIPTION OF THE INVENTION

The novel polycarbonate polymers of the invention are produced by reaction of a carbonate source material such as phosgene or a diaryl carbonate ester with a hydroxyaryl-containing spirodilactam and, optionally, a di(hydroxyphenyl)alkane. The preferred spirodilactam reactant is a 1,6-diazaspiro[4.4]nonane-2,7-dione reactant of up to 60 carbon atoms inclusive which is substituted on each spiro ring nitrogen atom with a hydroxyaryl-containing substituent and which is optionally substituted in the 3-, 4-, 8- and 9-positions with cyclic or acyclic substituents. One class of such spirodilactams is represented by the formula

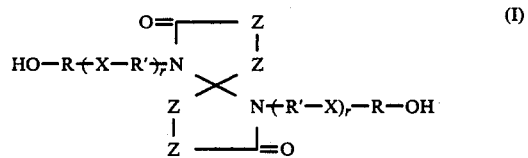

where Z independently is $>C(Z')_2$ in which Z' independently is hydrogen, lower alkyl of up to 4 carbon atoms inclusive, preferably methyl, halogen, preferably the lower halogens fluoro and chloro or aryl, preferably phenyl, or Z is such that two adjacent Z groups from a ring system Z" of from 5 to 7 ring atoms inclusive, up to two of which are heteroatoms selected from nitrogen, oxygen or sulfur with the remainder of the ring atoms being carbon atoms, there being up to 15 carbon atoms in each Z", two of which form a bridge between the carbon atoms connected by the two adjacent Z groups. In the above formula I, R independently is aromatic of up to 15 carbon atoms and from 1 to 2 aromatic rings, inclusive, R' independently is R or aliphatic of up to 10 carbon atoms, inclusive, r independently is 0 or 1 and X independently is a direct valence bond, alkylene of up to 8 carbon atoms, inclusive, oxy, thio, sulfonyl, carbonyl, dioxyphenylene, i.e., dioxybenzene, 2,2-di(oxyphenyl)propane, di(oxyphenyl) sulfone and dioxydiphenylene, i.e., dioxybiphenyl. The R, R' and X groups are otherwise hydrocarbyl containing only atoms of carbon and hydrogen besides any additional atoms present as divalent linking groups or are substituted hydrocarbyl additionally containing other atoms present as monovalent carbon atom substituents such as halogen, preferably the middle halogens chloro and bromo.

Spirodilactams of a considerable variety of structures are therefore suitably employed as a precursor of the polycarbonate polymers of the invention. In the embodiment of the invention wherein the Z moieties of the spirodilactam are acyclic, i.e., Z is $>C(Z')_2$, the spirodilactam is illustrated by 1,6-di(4-hydroxyphenyl)-1,6-diazospiro[4.4]nonane-2,7-dione, 1,6-di(4-hydroxyphenyl)-3,4,8,9-tetrafluro-1,6-diazaspiro[4.4]nonane-2,7-dione, 1,6-di(3-hydroxy-4-chlorophenyl)-3,8-dimethyl-1,6-diazaspiro[4.4]1,6-di(4-hydroxyphenyl)-3,3,4,4,8,8,9,9-octamethyl-1,6diazaspiro[4.4]nonane-2,7-dione, 1,6-di[4-(4'-hydroxybiphenyl)]-3,3diphenyl-1,6-diazaspiro[4.4]nonane-2,7-dione, 1,6-di[2-(4-hydroxyphenyloxy)-propyl]-1,6-diazaspiro[4.4]nonane-2,7-dione and 1,6-di[4-(4-hydroxyphenylisopropyl)phenyl]-1,6-diazaspiro[4.4]nonane-2,7-dione. In the embodiment wherein adjacent Z groups of the above formula I form a cyclic structure fused to each of the spiro rings, i.e., adjacent Z groups are Z", illustrative spirodilactams include 1,6-di(4-hydroxyphenyl)-3,4,8,9-dibenzo-1,6-diazaspiro[4.4]nonane-2,7-dione, and 1,6-di[4-(4-hydroxyphenylthio)phenyl]-3,4,8,9-di(pyrido)-1,6-diazaspiro[4.4]nonane-2,7-dione. Also suitable are the spirodilactams wherein one spiro ring has a fused ring substituent and the other spiro ring is free of fused ring substitutents, e.g., 1,6-di(4-hydroxyphenyl)-3,4-benzo- 8-methyl-1,6-diazaspiro[4.4]nonane-2,7-dione and diazaspiro[4.4]nonane-2,7-dione.

In general, the spirodilactams of the above formula I wherein each R and R' is aromatic and hydrocarbyl are preferred, particularly those compounds wherein each r is 0. The 1,6-di(hydroxyphenyl) spirodilactams are particularly preferred, especially the 1,6-di(4-hydroxyphenyl) spirodilactams. Within the spirodilactam portion of the molecule, those spirodilactams where the spiro rings are free from fused cyclic substituents are preferred as are the spirodilactams wherein each spiro ring has a fused cyclic substituent. The 1,6-diazaspiro[4.4]nonane-2,7-diones are the preferred members of the former class whereas 3,4,8,9-dibenzo-1,6-diazaspiro[4.4]nonane-2,7-diones are preferred among the latter class.

The hydroxyaryl-substituted spirodilactams of the above formula I are described in greater detail and are claimed in copending U.S. patent application Ser. No. 245,618, filed Sept. 16, 1988 . The general method of producing such spirodilactams is also disclosed and claimed in that copending U.S. patent application and in copending U.S. patent applications Ser. No. 172,000, filed Mar. 23, 1988, now abandoned, and Ser. No. 172,052, filed Mar. 23, 1988, now abandoned each of which is incorporated herein by reference. The process comprises the reaction of a hydroxyaryl-containing primary amino compound and a spirodilactam precursor. In terms of the spirodilactam of formula I, the primary amino compound is represented by the formula HO--R--(X--R')<sub>r</sub>NH<sub>2</sub>  (II)

wherein R, R', X and r have the previously stated meanings. The spirodilactam precursor is a 4-oxoheplanedioic acid compound or a 1,6-dioxaspiro[4.4]nonane-2,7-dione. In terms of the spirodilactam of formula I, the 4-oxoheplanedioic acid compound precursor of the spirodilactam is represented by the formula

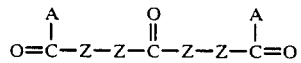   (IIIa)

wherein A independently is hydroxy, lower alkoxy of up to 4 carbon atoms inclusive or halo, preferably the middle halogens chloro and bromo, and Z has the previously stated meaning. The spirodilactone precursor of the spirodilactam of formula I is represented by the formula

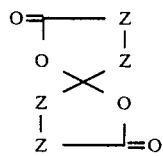   (IIIb)

wherein Z has the previously stated meaning.

The acyclic 4-oxoheptanedioic acid compounds are known or are produced by known methods, but certain of the esters are also produced by the reaction of formaldehyde and an ethylenically unsaturated carboxylic acid ester, e.g., methyl acrylate or ethyl methacrylate, in the presence of a catalyst system comprising a thiazolium salt and a tertiary amine, by the process disclosed and claimed in copending U.S. patent application Ser. No. 171,999, filed Mar. 23, 1988, now U.S. Pat. No. 4,800,231. Interconversion of the free acids, esters or acid halides of formula IIIa is by conventional methods. The production of 4-oxoheptanedioic acid compounds which contain cyclic moieties is by the process of Cava et al, J. Am. Chem. Soc., 77, 6022 (1955). The spirodilactones of formula IIIb are produced by the method of Pariza et al, Synthetic Communications, Vol. 13(3), pp. 243–254 (1983) or by the process of U.S. 1,999,181.

Reaction of the hydroxyaryl-containing primary amino compound and the spirodilactam precursor takes place in a liquid phase reaction environment in an inert reaction diluent such as an N-alkylamide such as N,N-dimethylformamide or N,N-dimethylacetamide. The reactants are provided in a molar ratio of about 2:1 and reaction occurs at an elevated reaction temperature, e.g., from about 80° C. to about 250° C. and a reaction pressure sufficient to maintain the reaction mixture in a liquid phase. Subsequent to reaction the hydroxyaryl-containing spirodilactam product is recovered from the product mixture by conventional methods such as solvent removal, precipitation or chromatographic techniques.

The optional reactant in the process of the invention is a di)hydroxyphenyl)alkane of up to 25 carbon atoms. Although a considerable variety of such di(hydroxyphenyl)alkanes are useful as optional components of the polycarbonate polymers of the invention, the preferred optional components are represented by the formula

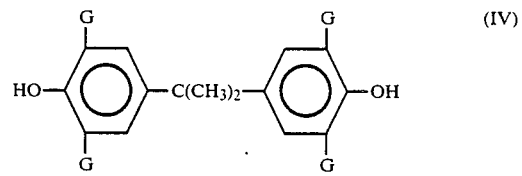   (IV)

wherein G independently is hydrogen, alkyl, preferably lower alkyl, or halo, preferably the middle halogens chloro or bromo. Illustrative of the di)hydroxyphenyl)alkanes of formula III are 2,2-di(4-hydroxyphenyl)-propane, 2,2-di(4-hydroxy-3-methylphenyl)propane, 2,2-di(4-hydroxy-3-chlorophenyl)-propane, 2,2-di(4-hydroxy-3,5-dibromophenyl)propane, 2-(4-hydroxyphenyl)-2-(4-hydroxy-3-chloro-5-methylphenyl)propane and 2-(4-hydroxyphenyl)-2-(4-hydroxyphenyl)-2-(4-hydroxy-3,5-dibromophenyl)propane. The preferred di(hydroxyphenyl)alkane compound is 2,2-di(4-hydroxyphenyl)propane.

The hydroxyaryl-substituted spriodilactam and, if present, the di(hydroxyphenyl)alkane, are converted to the polycarbonate polymer by reaction of the spirodilactam and hydroxyphenylalkane, if present, or metal salt thereof with a carbonate source. Although other metal salts are usefully employed in the modification where the salts of the hydroxycontaining reaction components are formed, in the preferred modification the spirodilactam and hydroxyphenylalkane, if present, are converted to the alkali metal salt, preferably the sodium salt or the potassium salt, by neutralization with an alkali metal hydroxide, carbonate or bicarbonate while any water present or formed is removed by distillation or by selective extraction. The resulting alkali metal salt or salts are recovered if desired by conventional methods but are also suitably reacted in situ to produce the polycarbonate polymer.

In the modification where no optional polymer component is to be present, i.e., the polycarbonate polymer is a copolymer, no salt of the hydroxyphenylalkane compound is formed, of course. In the modification where the desired polycarbonate polymer is a terpolymer the salt of the di(hydroxyphenyl)alkane is formed and is present in the reaction mixture. It is useful in such a modification to neutralize a mixture of the hydroxyaryl-substituted spirodilactam and the di(hydroxyphenyl)alkane and thereby form a mixture of salts. Alternatively, however, the salt of the hydroxyaryl-substituted spirodilactam and the salt of the hydroxyphenylalkane are produced separately and subsequently mixed.

The presence of the alkali metal salt in the reaction mixture of the di(hydroxypehnyl)alkane is optional and is not required, but when present the alkali metal salt of the di(hydroxyphenyl)alkane is optional and is not required, but when present the alkali metal salt of the di(hydroxypehnyl)alkane is present in a molar quantity up to twice the molar quantity of the alkali metal salt of the spirodilactam reactant. Preferably, the alkali metal salt of the di(hydroxyphenyl)alkane is present in a molar quantity up to equal that of the alkali metal salt of the hydroxyaryl-substituted spirodilactam.

The alkali metal salt, whether recovered or utilized in situ, is reacted in one modification with phosgene present in a slight molar excess over the total molar quantity of the other reactants. The reaction is conducted in an inert reaction solvent such as methylene chloride and under substantially ambient conditions of temperature and pressure. A quaternary ammonium salt such as tetraethylammonium bromide is optionally employed to facilitate the production of the polycarbonate polymer. The polymeric product thereby produced is recovered by conventional techniques such as solvent removal or precipitation with a non-solvent for the polymer.

In a second modification of the process for the production of the polycarbonate polymer, often preferred in part because of reasons of each of handling the reactants, the polycarbonate polymer is produced by contacting the hydroxyaryl-substituted spirodilactam and di(hydroxyphenyl)alkane, if present, without conversion to a salt, with an amount of a diaryl carbonate ester, particularly diphenyl carbonate, present in an amount approximately equimolar with the total of the other reactants. Such contacting is conducted in the absence of oxygen and preferably in an inert atmosphere. As the temperature of the resulting mixture is raised and the pressure is lowered, the components of the reaction mixture tend to undergo ester exchange and a hydroxyaryl compound, e.g., phenol, is driven from the reaction mixture as by distillation to produce the polycarbonate polymer. Temperatures from about 100° C. to about 300° C. are suitable for the ester exchange with preferred temperatures being from about 150° C. to about 250° C. The process is facilitated by reduced pressure, as by application of a vacuum, and by the presence of acidic or basic catalysts. Acid catalysts are illustrated by sulfonic acids such as p-toluenesulfonic acid or by acidic metal halides such as zinc chloride. Suitable basic catalysts include alkali metals and alkaline earth metals as well as their oxides, hydroxides or amides, or by other metal oxides. A preferred catalyst comprises lead oxide or zinc oxide and particularly mixtures thereof.

The resulting polycarbonate polymer is a linear polymer of moieties of carbonyl alternating with moieties of a 1,6-diazo [4.4]spirodilactam having oxyaryl-containing substituents on the spiro ring nitrogen atoms through which the spirodilactam moieties are connected to the carbonyl moieties and optionally moieties of di(oxyphenyl)alkane. One class of such polycarbonate polymers, in terms of the spirodilactams of formula I are copolymers represented by the repeating first segment formula

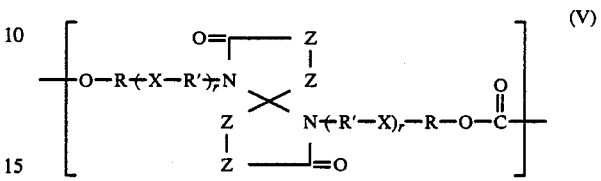

and terpolymers additionally containing a repeating second segment

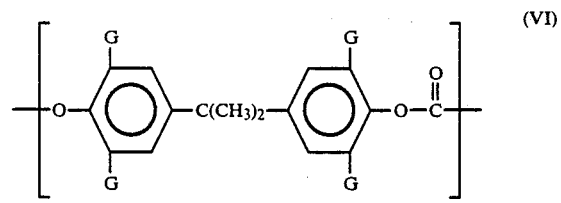

wherein R, R', r, X, Z and G have the previously stated meanings. Within the copolymers of the invention, only segments of the first type, i.e., segments of formula V are present. Within the terpolymers of the invention, formed when the di(hydroxyphenyl)alkane or a salt thereof is present in the reaction mixture, first repeating segments (formula V) and second repeating segments (formula VI) are found randomly throughout the polycarbonate polymer chain wherein the second segment is found in a molar quantity up to twice the molar quantity of the first segment, preferably in a molar quantity up to equal that of the first segment.

Although the nomenclature of such polymers is not easily determined because of the complexity thereof, the identity of the polycarbonate polymers will be apparent from consideration of the structures of the hydroxy-containing reactants (formula I and IV) as depicted above. By way of specific illustration, however, is the copolymer having alternating carbonyl moieties and moieties of 1,6-di(oxyphenyl)-1,6-diazaspiro[4.4]nonane-2,7-dione and the copolymer of alternating carbonyl moieties and moieties of 1,6-di(4-oxy-3-bromophenyl)-3,4,8,9-dibenzo-1,6-diazaspiro[4.4]nonane-2,7-dione. Corresponding terpolymers additionally having moieties of 2,2-di(4-oxyphenyl)propane result when 2,2-di(4-hydroxyphenyl)propane or a salt thereof is present in the reaction mixture. Of particular interest are the polycarbonate polymers of the formula IV having a molecular weight from about 10,000 to about 100,000. Preferred polycarbonate polymers of the above formula IV are those copolymers wherein each r is 0 and Z is >CH₂ or adjacent Z moieties taken together are benzo. The polymer of alternating moieties of carbonyl and 1,6-di(4-oxyphenyl)-1,6-diazaspiro[4.4]nonane-2,7-dione is particularly preferred.

The polycarbonate polymers are thermoplastic polymers and have the utilities normally associated with thermoplastic polymers. They are processed by the usual methods such as extrusion or injection molding into films, sheets and molded articles of demonstrated utility. In addition, however, because of the relatively high glass transition temperatures exhibited by the polycarbonate polymers of the invention, on occasion over 200° C. or even higher, they are also useful as engineering thermoplastics in applications likely to involve exposure to elevated temperature, e.g., containers for food and drink or base materials for electrical or electronic applications.

The invention is further illustrated by the following Illustrative Embodiments which should not be construed as limiting the invention.

Illustrative Embodiment I

A mixture of 33.8g (0.1 mole) of 1,6-di(4-hydroxyphenyl)-1,6-diazaspiro[4.4]nonane-2,7-dione, 25.7g (0.12 mole) of diphenyl carbonate, 0.02g of zinc oxide and 0.02g of lead oxide was melted in a suitable reactor under a nitrogen atmosphere. Phenol was distilled from the mixture at 180° C. and 50mm. After 0.5 hour, the temperature was raised to 200° C. and the pressure reduced to 15mm, and after an additional 0.5 hour the pressure was reduced to 2.3mm. Heating the mixture at 220° C. for 0.5 hour and at 250° C. for an additional 2 hours gave a hard, solid polycarbonate with a glass transition temperature of 223° C. The nuclear magnetic resonance spectra of the product was consistent with a repeating formula of alternating carbonyl units and units of 1,6-di(4-oxyphenyl)-1,6-diazaspiro-[4.4]nonane-2,7-dione.

By way of contrast, the commercial polycarbonate based on 2,2-di(4-hydroxyphenyl)propane marketed by General Electric under the tradename LEXAN® Polycarbonate had a glass transition temperature of 150° C.

ILLUSTRATIVE EMBODIMENT II

A mixture of 11.4g (0.05 mole) of 2,2-di(4-hydroxyphenyl)propane, 16.9g (0.05 mole) of 1,6-di(4-hydroxyphenyl)-1,6-diazaspiro[4.4]nonane-2,7-dione, 25.7g (0.12 mole) of diphenylcarbonate, 0.02g of zinc oxide and 0.02g of lead oxide was melted in a reactor under a nitrogen atmosphere. Phenol was removed from the mixture by distillation at 180° C. and 50 mm. After 0.5 hour, the temperature was raised to 200° C. and the pressure was reduced to 0.15 mm, and after an additional 0.5 hour the pressure was reduced to 2.3 mm. Heating the resulting mixture at 220° C. for 0.5 hour and at 250° C. for an additional 2 hours gave a hard, solid polycarbonate resin with a glass transition temperature of 164° C. The nuclear magnetic resonance spectra of the product was consistent with a polymer having repeating units of di(4-oxyphenyl)propane and 1,6-di(4-oxyphenyl)-1,6-diazaspiro[4.4]nonane-2,7-dione separated by carbonyl units.

What is claimed is:

1. A polycarbonate polymer having a first repeating segment of the formula

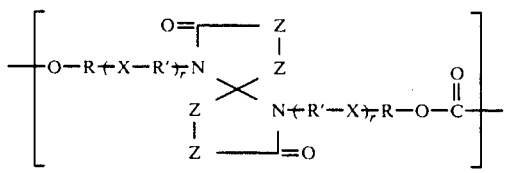

and up to twice the molar quantity of the first segment of a second repeating segment

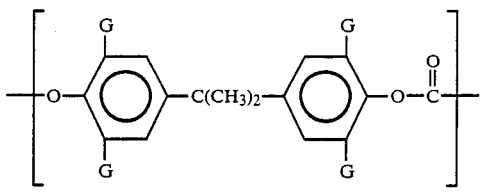

wherein R is aromatic of up to 15 carbon atoms and up to two aromatic rings, inclusive, R' is R or aliphatic of up to 10 carbon atoms, inclusive, r is 0 or 1, X is a direct valence bond or X represents alkylene of up to 8 carbon atoms, inclusive, OXY, thio, sulfonyl, carbonyl, dioxyphenylene, 2,2-di(oxyphenyl)propane, di(oxyphenyl) sulfone or dioxydiphenylene, Z independently is $>C(Z')_2$ in which $Z'$ independently is hydrogen, lower alkyl, fluoro, chloro or phenyl, or Z is such that two adjacent Z groups taken together form a ring system Z'' of from 5 to 7 ring atoms up to two of which are heteroatoms selected from nitrogen, oxygen or sulfur with the remainder of the ring atoms being carbon atoms, two of which form a bridge between the carbon atoms connected by the adjacent Z groups, and G is hydrogen, lower alkyl, chloro or bromo.

2. The polycarbonate polymer of claim 1 wherein the polymer is a copolymer.

3. The polycarbonate polymer of claim 2 wherein R' is aromatic.

4. The polycarbonate copolymer of claim 3 wherein each r is 0.

5. The polycarbonate copolymer of claim 4 wherein each Z is $>C(Z')_2$.

6. The polycarbonate copolymer of claim 5 wherein Z' is hydrogen or methyl.

7. The polycarbonate copolymer of claim 6 wherein R is phenylene.

8. The polycarbonate copolymer of claim 7 wherein R is 4-phenylene.

9. The polycarbonate copolymer of claim 8 wherein Z' is hydrogen.

10. The polycarbonate copolymer of claim 4 wherein adjacent Z moieties are Z''.

11. The polycarbonate copolymer of claim 10 wherein Z'' is benzo.

12. The polycarbonate copolymer of claim 11 wherein R is phenylene.

13. The polycarbonate copolymer of claim 12 wherein R is 4-phenylene.

14. The polycarbonate polymer of claim 1 wherein the polymer is a terpolymer.

15. The polycarbonate terpolymer of claim 14 wherein R' is aromatic.

16. The polycarbonate terpolymer of claim 15 wherein each r is 0.

17. The polycarbonate terpolymer of claim 16 wherein G is bromo.

18. The polycarbonate terpolymer of claim 16 wherein G is hydrogen.

19. The polycarbonate terpolymer of claim 18 wherein the molar quantity of the second segment is up to equal to the molar quantity of the first segment.

20. The polycarbonate terpolymer of claim 19 wherein each Z is $>C(Z')_2$.

21. The polycarbonate terpolymer of claim 20 wherein Z' is hydrogen or methyl.

22. The polycarbonate terpolymer of claim 21 wherein R is phenylene.

23. The polycarbonate terpolymer of claim 22 wherein R is 4-phenylene.

24. The polycarbonate terpolymer of claim 23 wherein Z' is hydrogen.

25. The polycarbonate terpolymer of claim 19 wherein adjacent Z groups are Z''.

26. The polycarbonate terpolymer of claim 25 wherein R is phenylene.

27. The polycarbonate terpolymer of claim 26 wherein Z'' is benzo.

28. The polycarbonate terpolymer of claim 27 wherein R is 4-phenylene.

* * * * *